United States Patent
Lo et al.

(10) Patent No.: US 7,746,540 B2
(45) Date of Patent: Jun. 29, 2010

(54) ELECTROWETTING DISPLAY DEVICES AND FABRICATION METHODS THEREOF

(75) Inventors: Kuo-Lung Lo, Taipei County (TW); Chih-Chun Hsiao, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 44 days.

(21) Appl. No.: 12/240,622

(22) Filed: Sep. 29, 2008

(65) Prior Publication Data
US 2009/0168144 A1 Jul. 2, 2009

(30) Foreign Application Priority Data
Dec. 28, 2007 (TW) .............. 96150822 A (51) Int. Cl.
*G02B 26/00* (2006.01)
(52) U.S. Cl. ............ 359/290; 359/245; 359/253; 359/254; 359/291; 359/292; 359/316
(58) Field of Classification Search ............ 359/245, 359/253, 254, 290–292, 316
See application file for complete search history.

(56) References Cited

U.S. PATENT DOCUMENTS 7,420,549 B2 * 9/2008 Jacobson et al. ............ 345/204

2005/0111842 A1 * 5/2005 Nakagawa ............ 396/85
2006/0134323 A1 6/2006 O'Brien
2007/0188676 A1 8/2007 Choi et al.

FOREIGN PATENT DOCUMENTS

| WO | WO 2005051091 | 6/2005 |
| WO | WO 2005/098524 | 10/2005 |
| WO | WO 2006/017129 | 2/2006 |

* cited by examiner

*Primary Examiner*—Evelyn A. Lester
(74) *Attorney, Agent, or Firm*—Quintero Law Office (57) ABSTRACT

Electrowetting display devices and fabrication methods thereof are presented. The electrowetting display device includes a first substrate and a second substrate with a polar fluid layer and a non-polar fluid layer insolvable to each other and interposed between the first and second substrates. A first transparent electrode is disposed on the first substrate. A second electrode is disposed on the second substrate. A dielectric layer is disposed on the second electrode. A hydrophilic partition wall structure is directly disposed on the dielectric layer defining a plurality of pixel regions. A layer of low surface energy material is disposed on the dielectric layer within each of the pixel region.

15 Claims, 12 Drawing Sheets

ELECTROWETTING DISPLAY DEVICES AND FABRICATION METHODS THEREOF

CROSS REFERENCE TO RELATED APPLICATIONS

This application is based upon and claims the benefit of priority from a prior Taiwanese Patent Application No. 096150822, filed on Dec. 28, 2007, the entire contents of which are incorporated herein by reference.

BACKGROUND OF THE INVENTION

1. Field of the Invention

The invention relates to display devices, and in particular to electrowetting display devices and fabrication methods thereof.

2. Description of the Related Art

Electrowetting display devices are rendered images in accordance with electrowetting or electrocapillary. Briefly, the free surface energy of some fluids is changed due to electric field effects such that distribution area of the fluids can thus change along with the electric field effects.

Figure 1:
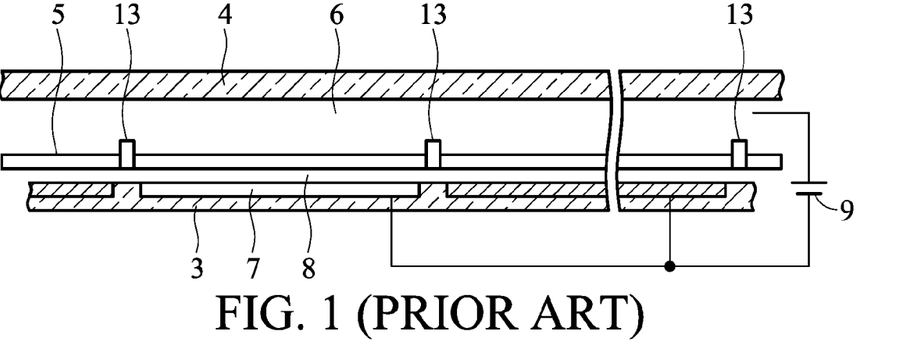
FIG. 1 is a cross section of a conventional electrowetting display device.

PCT publication No. WO 2005/051091, the entirety of which is hereby incorporated by reference, discloses a structure of an electrowetting display device. Referring to FIG. 1, a conventional electrowetting display device comprises a second substrate 3 and a first substrate 4 opposing to each other. A patterned pixel electrode 7 is disposed on the second substrate 3. A dielectric layer 8 such as a material layer with a hydrophobic surface is disposed on the second substrate 3 and the pixel electrode 7. Patterned hydrophilic bank structures 13 (such as pixel walls) are disposed on the dielectric layer 8 defining each pixel region. An opaque non-polar fluid 5 including black dyes is disposed in the pixel region between bank structures 13. A transparent polar fluid 6 is disposed between the gap between the first substrate 4 and the second substrate 3. When the operatic voltage is off, the opaque non-polar fluid 5 is uniformly distributed within each pixel region, thus the display status is a dark state.

When the operatic voltage is on, i.e., an electric field is generated between the first substrate 4 and the second substrate 3 by a voltage source 9, the opaque non-polar fluid 5 is cohered due to an electrowetting effect, thereby exposing most of the pixel region. Thus, the display status is a bright state.

The bank structure of the conventional electrowetting display device is a hydrophilic structure which is directly formed on the dielectric layer 8 with hydrophobic low-surface-energy. It is beneficial that the low-surface-energy material can be entirely applied to and formed on the substrate. However, it is difficult to fabricate the hydrophilic bank structure 13 directly on the dielectric layer 8. The hydrophilic bank structure 13, moreover, is prone to peel off from the low-surface-energy dielectric layer 8 causing display failure.

Figure 2:
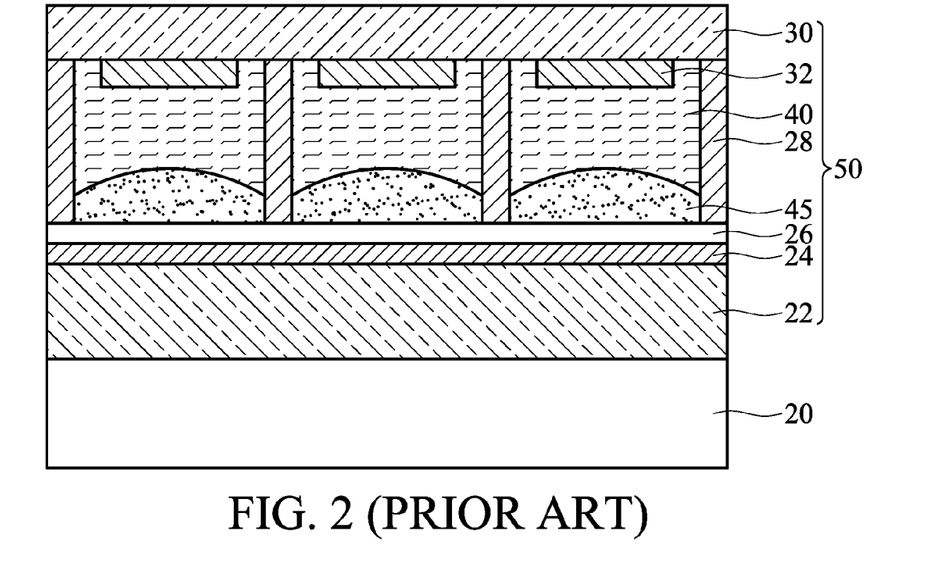
FIG. 2 is a cross section of another conventional electrowetting display device.

U.S. Pub. No. 2007/0188676, the entirety of which is hereby incorporated by reference, discloses an electrowetting display device. Coherence of the opaque non-polar fluid is controlled by an operatic electric field due to the electrowetting effect, thereby displaying a bright-state and a dark-state, respectively. FIG. 2 is a cross section of another conventional electrowetting display device. Referring to FIG. 2, the conventional electrowetting display device includes a back light unit 20 and an electrowetting display 50 serving as a light switch. The electrowetting display 50 includes a second substrate 22, a pixel electrode 24 disposed on the second substrate 22, and a dielectric layer (with a hydrophobic surface) 26 disposed on the pixel electrode 24. Patterned hydrophilic bank structures 28 are disposed on the dielectric layer 26 defining each pixel region. An opaque non-polar fluid 45 with black dyes and a transparent polar fluid 40 are disposed within each pixel region. The first substrate 30 with patterned common electrodes 32 disposed thereon is arranged on the bank structure 28 and transparent polar fluid 40 opposing to the second substrate 22.

Furthermore, PCT publication No. WO 2006/017129, the entirety of which is hereby incorporated by reference, discloses a transflective electrowetting display structure in which a second substrate and a first substrate attached with color filters are assembled. A polar fluid and a black non-polar fluid are interposed between the second and first substrate. The transflective color electrowetting display includes a plurality of pixels. Each pixel is divided into a transmission region and a reflective region on the second substrate.

Figure 3:
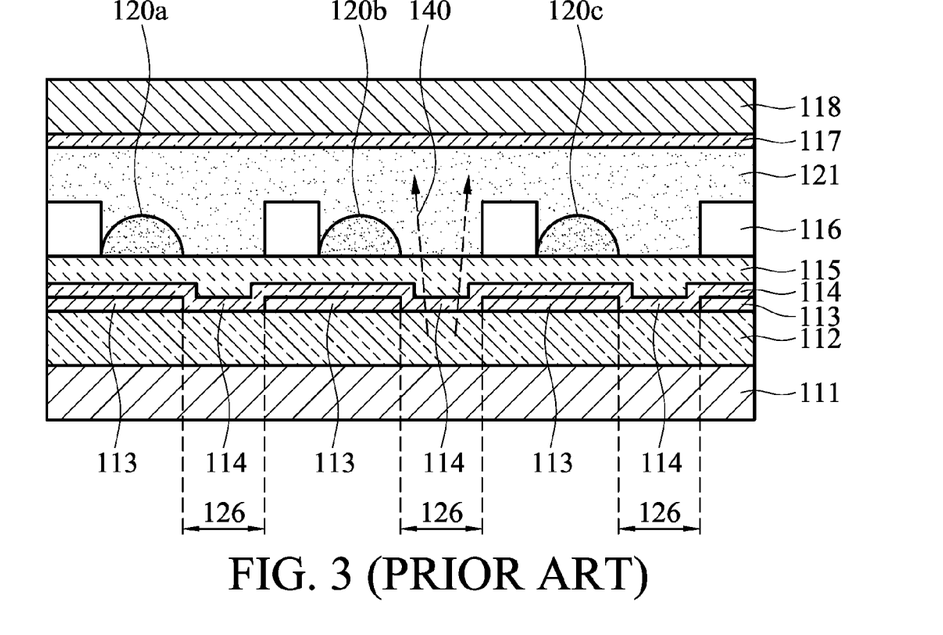
FIG. 3 is a cross section of a conventional transflective electrowetting display.

FIG. 3 is a cross section of a conventional transflective electrowetting display. Referring to FIG. 3, the conventional transflective color electrowetting display includes a second substrate 112 disposed on a back light unit 111. A patterned reflector 113 corresponding to the reflective region of each pixel is disposed on the second substrate 112. A second transparent electrode 114 is disposed on the entire region of the second substrate 112 covering the reflector 113. A dielectric layer (with hydrophobic surface characteristics) 115 is disposed on the second transparent electrode 114. A patterned bank structure 116 is disposed on the dielectric layer 115 defining a plurality of pixel regions.

A first substrate 118 is opposing to the second substrate 112. A first transparent electrode 117 is disposed on the first substrate 118. A transparent polar fluid layer 121 and opaque non-polar fluid layers 120a-120c are interposed in the gap between the second substrate 112 and the first substrate 118. A power supply applies a bias between the first transparent electrode 114 and the second transparent electrode 117. An electrowetting force due to the bias causes convergence of the opaque non-polar fluid layer, thereby controlling reflective and transmissive regions of each pixel operation. When the applied voltage exceeds the threshold voltage, the opaque non-polar fluid layer begins to converge gradually exposing both the reflective and transmissive regions.

The second substrate structure of the conventional electrowetting display primarily includes a material layer with low-surface energy and a patterned hydrophilic structure fabricated on the low-surface energy layer. However, since the surface of the low-surface energy layer has anti-adhesion properties, it is difficult to proceed with subsequent large area application and processes. Moreover, even if a hydrophilic structure is firmly formed on the low-surface energy layer, the hydrophilic structure will easily be peeled off from the low-surface energy layer due to its surface characteristics. Therefore, there is a need for a fabricating method, which firmly fabricates a hydrophilic structure on a low-surface energy dielectric layer, overcoming problems associated with the surface characteristics of the hydrophilic structure, so as to improve structural stability of an electrowetting display device.

BRIEF SUMMARY OF THE INVENTION

The main features and key aspects of the invention are related to structures of electrowetting display devices and fabrication methods thereof. A low-surface energy dielectric layer is patterned so that the hydrophilic bank structure is directly formed between the patterned low-surface energy layer, and the bottom of the hydrophilic bank structure directly contacts the underlying dielectric layer. The fabrication process of the hydrophilic structure is simplified, and structural reliability is improved.

Embodiments of the invention provide an electrowetting display device, comprising: a first substrate and a second substrate opposing to each other with a polar solution layer and a non-polar solution layer interposed therebetween; a first transparent electrode disposed on the first substrate; a second electrode disposed on the second substrate; a dielectric layer disposed on the second electrode; a bank structure with a hydrophilic surface directly disposed on the dielectric layer, wherein a plurality of regions are defined by the bank structure; and a layer of low-surface-energy material disposed on the dielectric layer within the plurality of regions.

Embodiments of the invention also provide an electrowetting display device, comprising: a first substrate and a second substrate opposing to each other with a transparent polar solution layer and an opaque non-polar solution layer interposed therebetween; a first transparent electrode disposed on the first substrate; a second electrode disposed on the second substrate; a dielectric layer disposed on the second electrode; a bank structure with a hydrophilic surface directly disposed on the dielectric layer, wherein a plurality of pixel regions are defined by the bank structure; and a layer of low-surface-energy material disposed on the dielectric layer within the plurality of pixel regions.

Embodiments of the invention further provide a fabrication method for an electrowetting display device, comprising: providing a first substrate and forming a first transparent electrode layer thereon; providing a second substrate and forming a second electrode layer thereon; forming a dielectric layer on the second electrode; forming a patterned layer of low-surface-energy material on the dielectric layer exposing a portion of the dielectric layer; forming a bank structure with a hydrophilic surface on the dielectric layer, wherein a plurality of regions are defined by the bank structure exposing the patterned layer of low-surface-energy material; and oppositely assembling the first substrate and the second substrate with a polar solution layer and a non-polar solution layer sandwiched therebetween.

Embodiments of the invention still further provide a fabrication method for an electrowetting display device, comprising: providing a first substrate and forming a first transparent electrode layer thereon; providing a second substrate and forming a second electrode layer thereon; forming a dielectric layer on the second electrode; forming a bank structure with a hydrophilic surface on the dielectric layer, wherein a plurality of pixel regions are defined by the bank structure; forming a patterned layer of low-surface-energy material on the dielectric layer within the plurality of pixel regions; and oppositely assembling the first substrate and the second substrate with a polar solution layer and a non-polar solution layer sandwiched therebetween.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

It is to be understood that the following disclosure provides many different embodiments, or examples, for implementing different features of various embodiments. Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself indicate a relationship between the various embodiments and/or configurations discussed. Moreover, the formation of a first feature over or on a second feature in the description that follows may include embodiments in which the first and second features are formed in direct contact or not in direct contact.

Figure 4A:
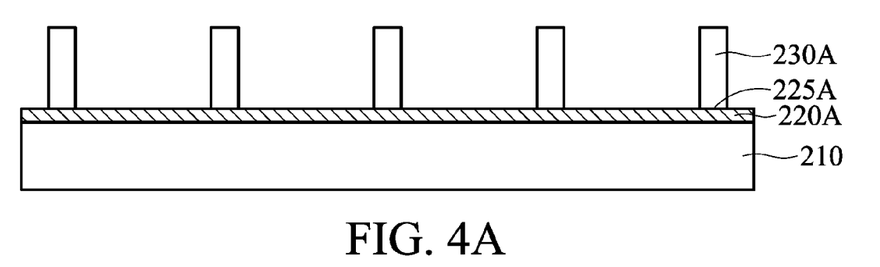
FIG. 4A and FIG. 4B are comparisons respectively illustrating a conventional second substrate structure and an embodiment of the second substrate structure of the electrowetting display device of the invention.

FIG. 4A and FIG. 4B are comparisons respectively illustrating a conventional second substrate structure and an embodiment of the second substrate structure of the electrowetting display device of the invention. Referring to FIG. 4A, the second substrate structure of the conventional electrowetting display includes a second substrate structure with a dielectric layer (not shown) thereon. A material layer of low-surface-energy (or with hydrophobic surface characteristics) 220A is entirely and blanketly formed on the second substrate structure 210. Next, a bank structure 230A with a hydrophilic surface is formed on the low-surface-energy material layer 220A. However, as mentioned previously, since the surface of the low-surface-energy material layer 220A has anti-adhesion properties, the interface 225A between the low-surface-energy material layer 220A and the bank structure 230A can not create desirable adhesion due to polarity differences such that it is difficult to proceed with large area applications and subsequent processes. Moreover, even if a hydrophilic structure is firmly formed on the low-surface energy layer 220A, the hydrophilic structure will easily be peeled off from the dielectric layer.

Figure 4B:
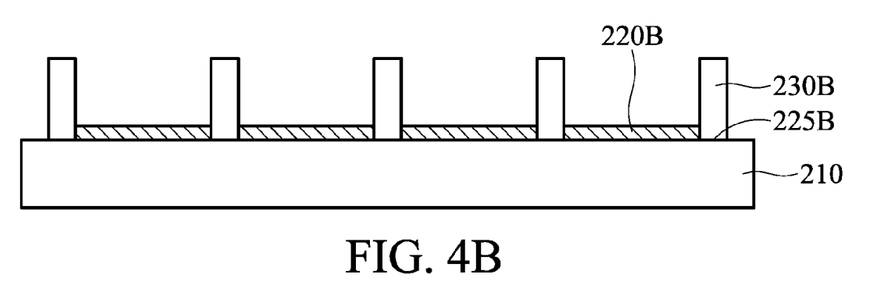

Conversely, referring to FIG. 4B, an embodiment of the second substrate structure of the electrowetting display includes a second substrate structure 210 with other active devices, passive devices, pixel electrodes and a dielectric layer (not shown) covering thereon. A patterned low-surface-energy material layer (or a layer with hydrophobic surface characteristics) 220B is formed on the second substrate structure 210 exposing predetermined intervals of surfaces of the second substrate structure. Next, a bank structure 230B with a hydrophilic surface is formed between the patterned low-surface-energy material layers 220B. Therefore, the bank structure 230B is prevented from not directly forming on the low-surface-energy material layer 220B. The interface between the second substrate structure 210 and the bank structure 230B has excellent adhesion because of polar compatibility, thereby improving reliability of the electrowetting display device.

Figure 5:
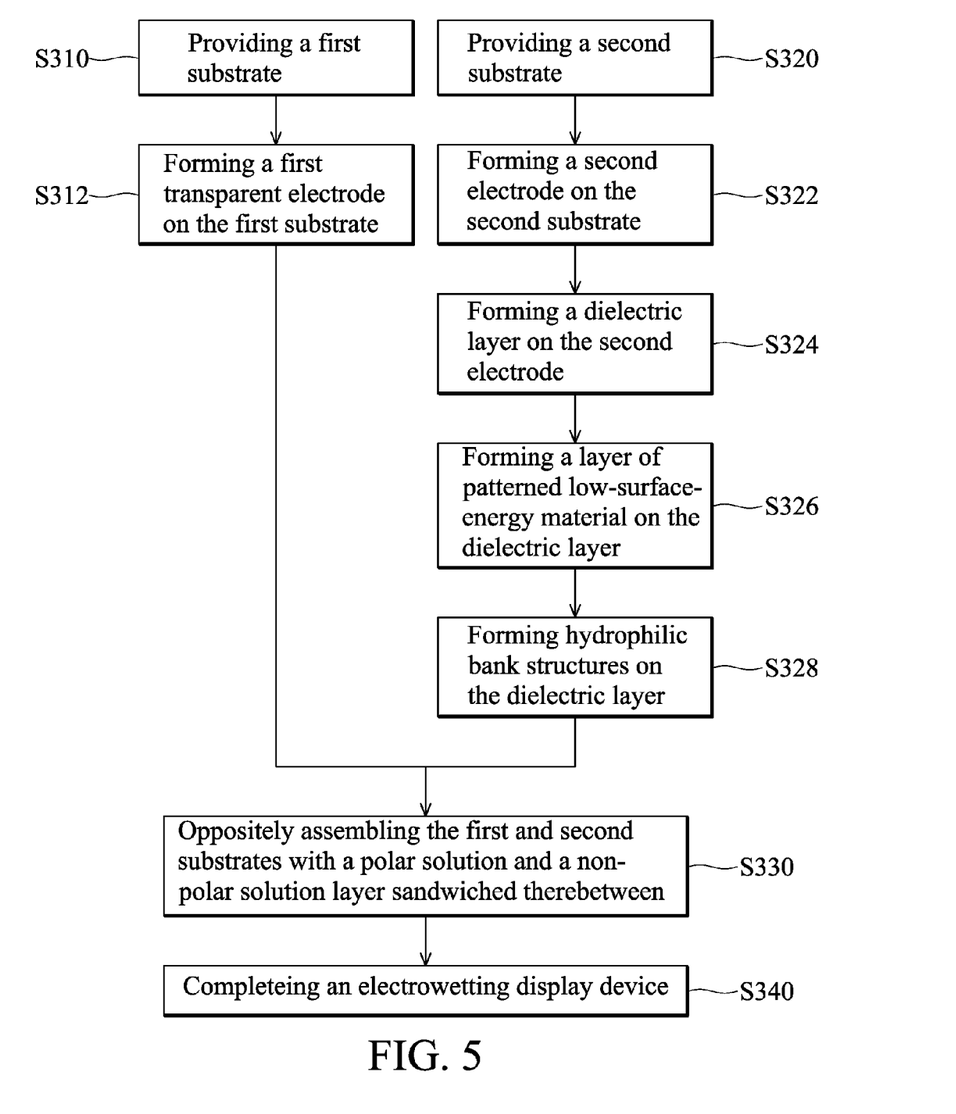
FIG. 5 is a fabrication flowchart of an embodiment of the electrowetting display device of the invention.

FIG. 5 is a fabrication flowchart of an embodiment of the electrowetting display device of the invention. Referring to FIG. 5, a fabrication method for the electrowetting display device includes providing a first substrate (step S310) and forming a first transparent electrode on the first substrate (step S312). Additionally, a second substrate is provided (step S320). A second electrode is formed on the second substrate (step S322). The second electrode can be a transparent electrode or a reflective electrode. Next, a dielectric layer is formed on the second electrode (step S324), and a layer of patterned low-surface-energy material is then formed on the dielectric layer (step S326), corresponding to each pixel region with an interval portion of the surface of the dielectric layer exposed. Subsequently, hydrophilic bank structures are formed on the dielectric layer (step S328). The bank structures are positioned on the interval portion of the exposed surface of the dielectric layer. The bank structures directly contact the dielectric layer, thereby defining a plurality of regions and exposing the low-surface-energy material layer. Next, the first and second substrates are oppositely assembled with a polar solution and a non-polar solution layer sandwiched therebetween (step S330). Subsequently, other essential fabrication steps such as assembling a back light unit and color filters are proceeded to complete the electrowetting display device (step S340).

Figure 6A:
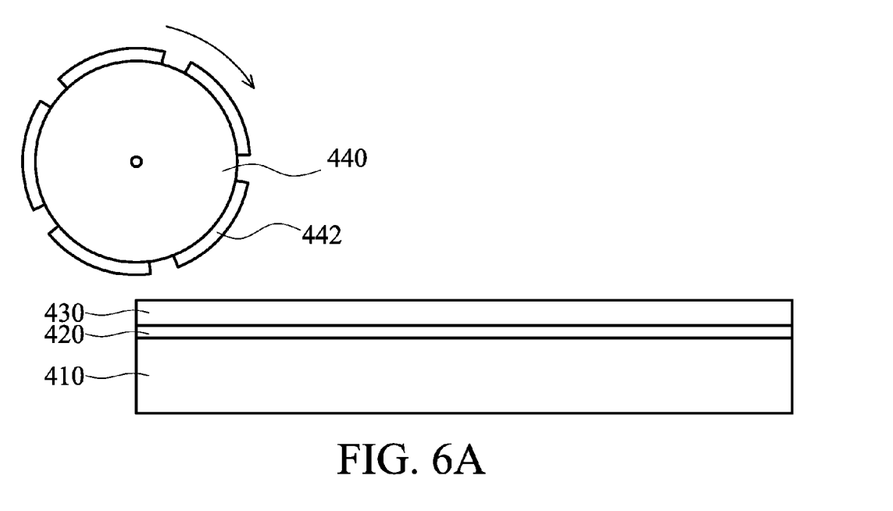
FIGS. 6A-6E are cross sections respectively illustrating each fabrication step of an embodiment of the electrowetting display device of the invention.

FIGS. 6A-6E are cross sections respectively illustrating each fabrication step of an embodiment of the electrowetting display device of the invention. Referring to FIG. 6A, a second substrate 410 is provided and is made of materials including glass, polymer or metal. A second electrode 420 is disposed on the second substrate 410. Next, a dielectric layer 430 is formed on the second electrode 420.

The second electrode 420 is a patterned structure including a rectangular, square, triangular, circular, trapezoid, or elliptic shape. The second electrode is made of metal or oxide with a thickness approximately in a range between 0.01 μm and 1 μm.

The dielectric layer 430 is made of silicon dioxide ($SiO_2$), silicon nitride ($SiN_x$), tantalum oxide ($Ta_2O_3$), lead zirconate titanate (PZT), barium strontium titanate (BST), barium titanate (BTO) or polyvinylidene difluoride (PVDF).

Figure 6B:
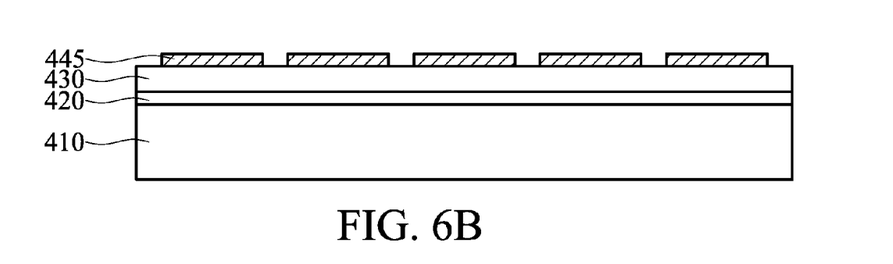

Subsequently, a relief printing process is performed. The patterned low-surface-energy material layer 445 is transferred on the dielectric layer 430 by a roller 440 and a relief printing plate 442. The pattern of the low-surface-energy material layer 445 corresponds to each pixel region with an interval portion of the surface of the dielectric layer 430 exposed, as shown in FIG. 6B. The low-surface-energy material layer 445 comprises fluoride-containing or chloride-containing hydrophobic polymer materials, or fluoride-containing or chloride-containing self-assembly monolayer films. The thickness of the low-surface-energy material layer is approximately in a range between 0.1 nm and 1 μm, and the surface energy of the low-surface-energy material layer is approximately 25 dyne/cm, preferably less than 20 dyne/cm.

Figure 6C:
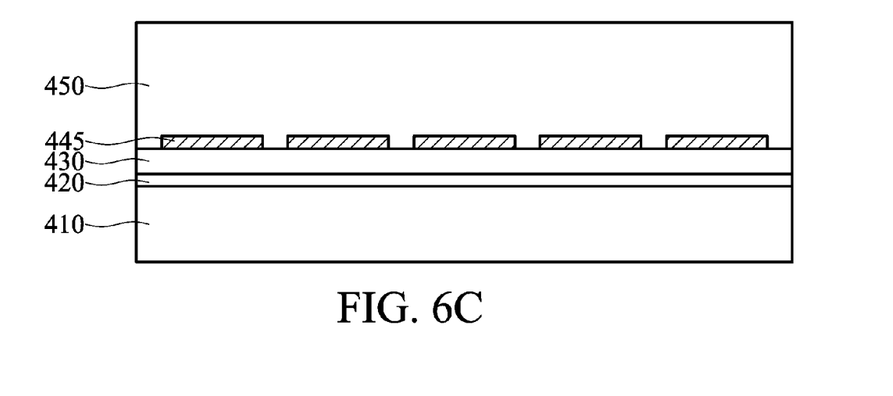

Referring FIG. 6C, a thick-film material layer 450 such as a positive photoresist, a negative photoresist, a photoset resin or a thermoset resin is entirely and blanketly formed on the dielectric layer 430 covering the low-surface-energy material layer 445. Subsequently, a lithography process is performed to pattern the thick-film material layer 450, thereby creating a bank structure 450 with a hydrophilic surface. The bank structure 450 is positioned on the interval portion of the exposed surface of the dielectric layer 430. The bank structure 450 directly contacts the dielectric layer 430, thereby defining a plurality of regions and exposing the low-surface-energy material layer 445, as shown in FIG. 6D.

Note that the bank structure 450 can be a black matrix bank structure capable of absorbing visible lights. The thickness of the bank structure is approximately in a range between 5 μm and 50 μm.

Figure 6D:
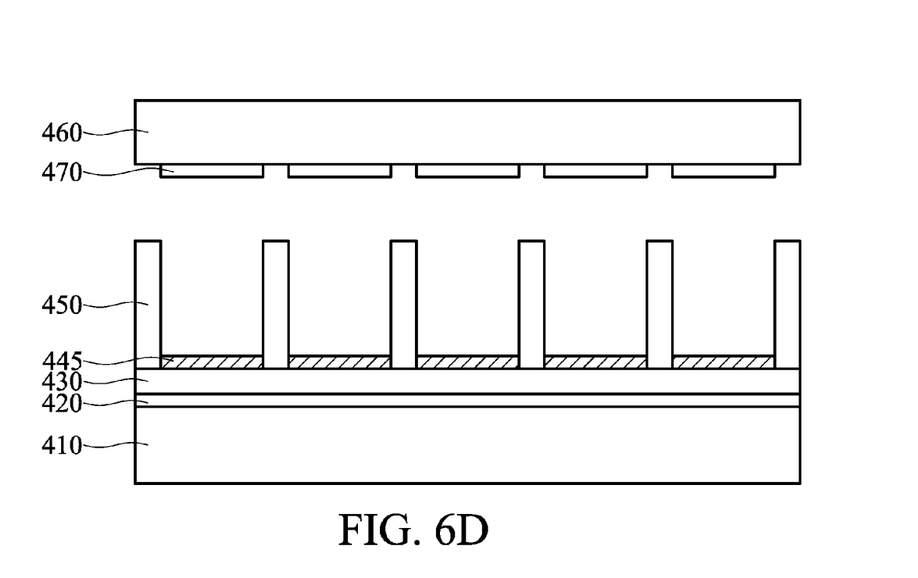

Referring to FIG. 6D, on the other hand, a first substrate 460 is provided. A transparent electrode 470 is formed on the first substrate 460. The first substrate 460 is made of glass, polymer or metal. The first transparent electrode 470 is a patterned structure comprising a rectangular, square, triangular, circular, trapezoid, or elliptic shape. Alternatively, the transparent electrode 470 can be an entirely blanket electrode structure. Moreover, the first transparent electrode 470 is made of metal or oxide with a thickness approximately in a range between 0.01 μm and 1 μm.

Figure 6E:
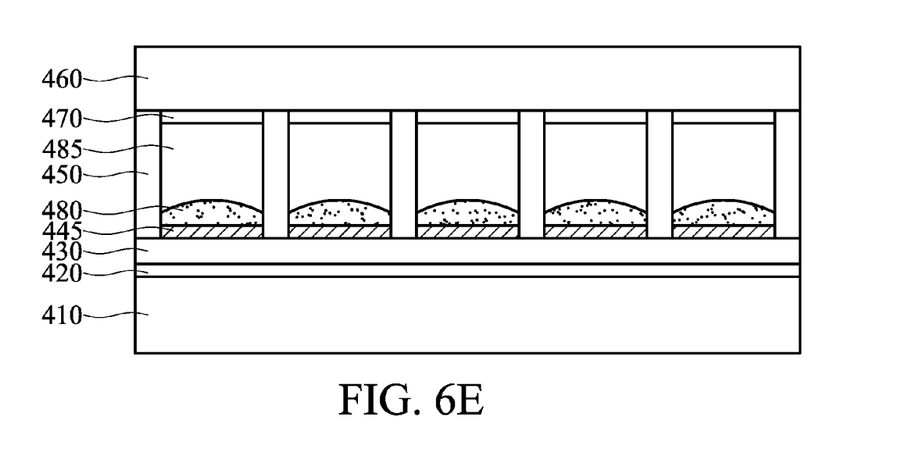

Subsequently, the second substrate 410 and the first substrate 460 are oppositely assembled with a non-polar solution layer 480 and a polar solution layer 485 interposed therebetween, as shown in FIG. 6E. The non-polar solution layer 480 can be made of silicon oil, decane, dodecane, tetradecane, or any combinations thereof. The thickness of the non-polar solution layer is approximately in a range between 1 μm and 10 μm. The non-polar solution layer 480 can further comprise a color dye or a color pigment. On the other hand, the polar solution layer 485 can be made of water, sodium chloride solution, or potassium chloride solution with a thickness approximately in a range between 10 μm and 100 μm.

Figure 7A:
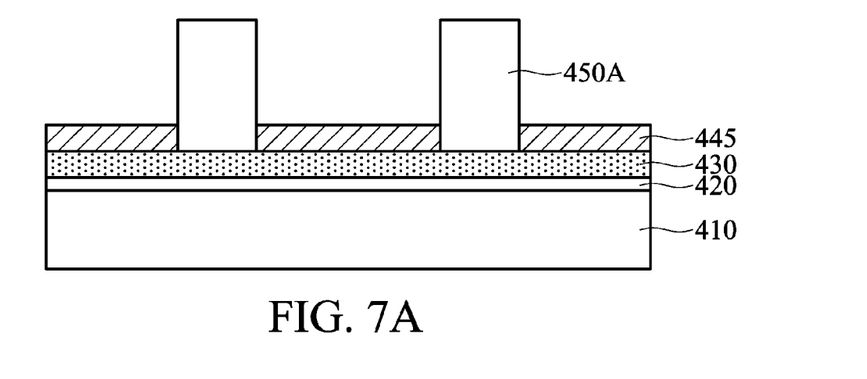
FIGS. 7A-7D are schematic views illustrating various exemplary bank structures with hydrophilic surfaces according to embodiments of the invention.
Figure 7B:
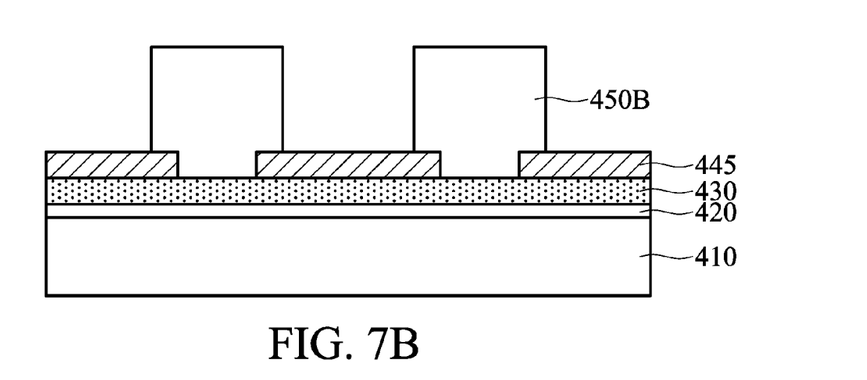
Figure 7C:
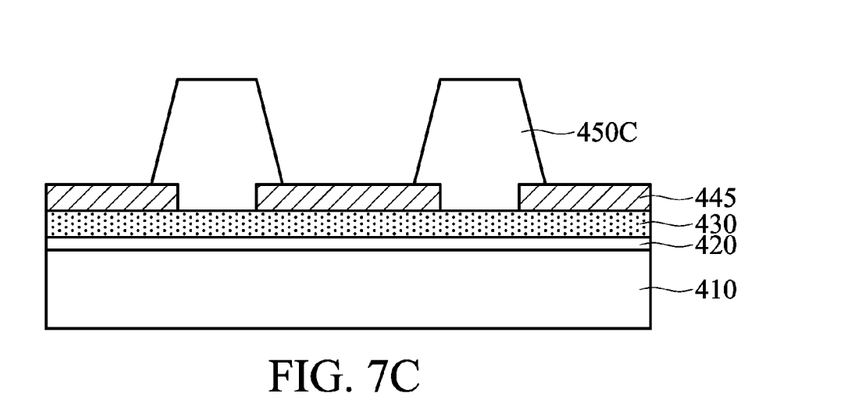
Figure 7D:
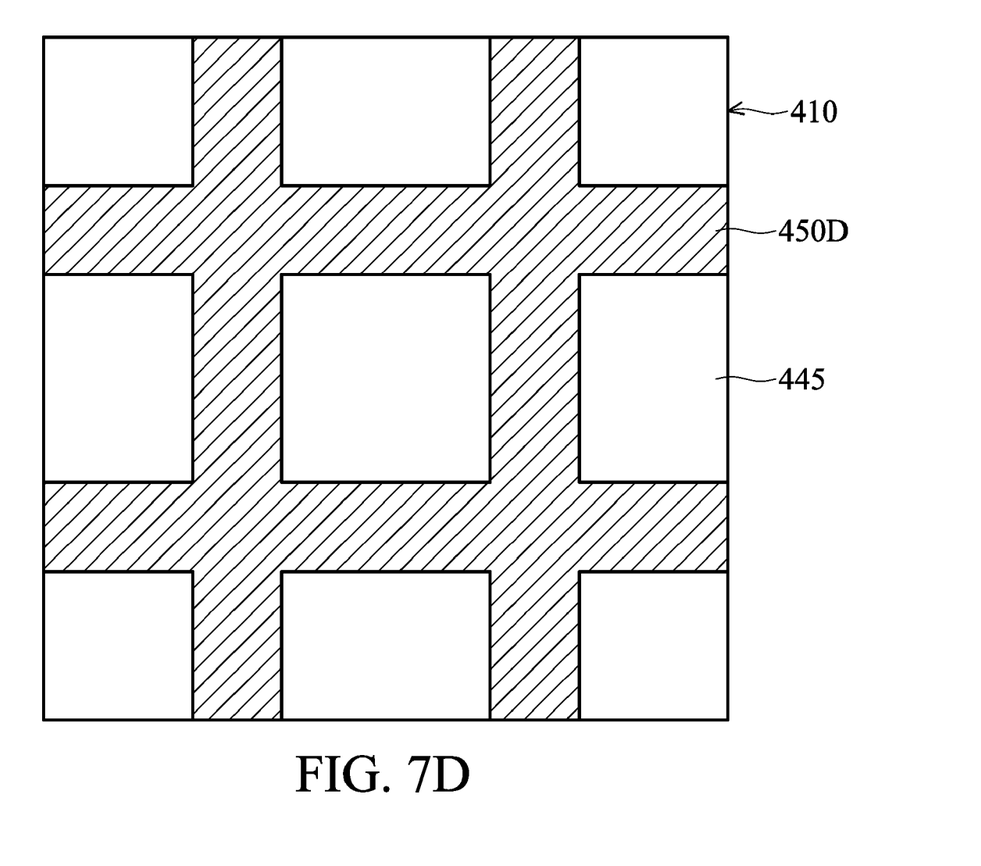

FIGS. 7A-7D are schematic views illustrating various exemplary bank structures with hydrophilic surfaces according to embodiments of the invention. These bank structures are exemplified merely for illustration, and are not limited thereto. Referring to FIG. 7A, the bank structure 450A with a hydrophilic surface can be a striped ridge shape with a uniform width which is equal to that of intervals of the patterned low-surface-energy material layer 445. Referring to FIG. 7B, according to another embodiment, the bank structure 450B with a hydrophilic surface can directly contact the dielectric layer 430 and have two flank extension portions contacting the low-surface-energy material layer 445. The top of the bank structure 450B is wider than or has the same width as the bottom of the bank structure 450B. Alternatively, referring to FIG. 7C, the bank structure 450C with a hydrophilic surface can directly contact the dielectric layer 430 and have a cross section of a trapezoid, i.e., the top of the bank structure 450C is narrower than the bottom of the bank structure 450C. Referring to FIG. 7D, the bank structure 450D with a hydrophilic surface can be a checkered pattern. Alternatively, the shape of the low-surface-energy material layer 445 is striped, and the shape of the bank structure 450D is a checkered pattern. The bank structure 450D with a hydrophilic surface directly contacts the dielectric layer 430 along the direction of the stripes, and the bank structure 450D directly contacts the low-surface-energy material layer 445 crossing the direction of the stripes.

Figure 8:
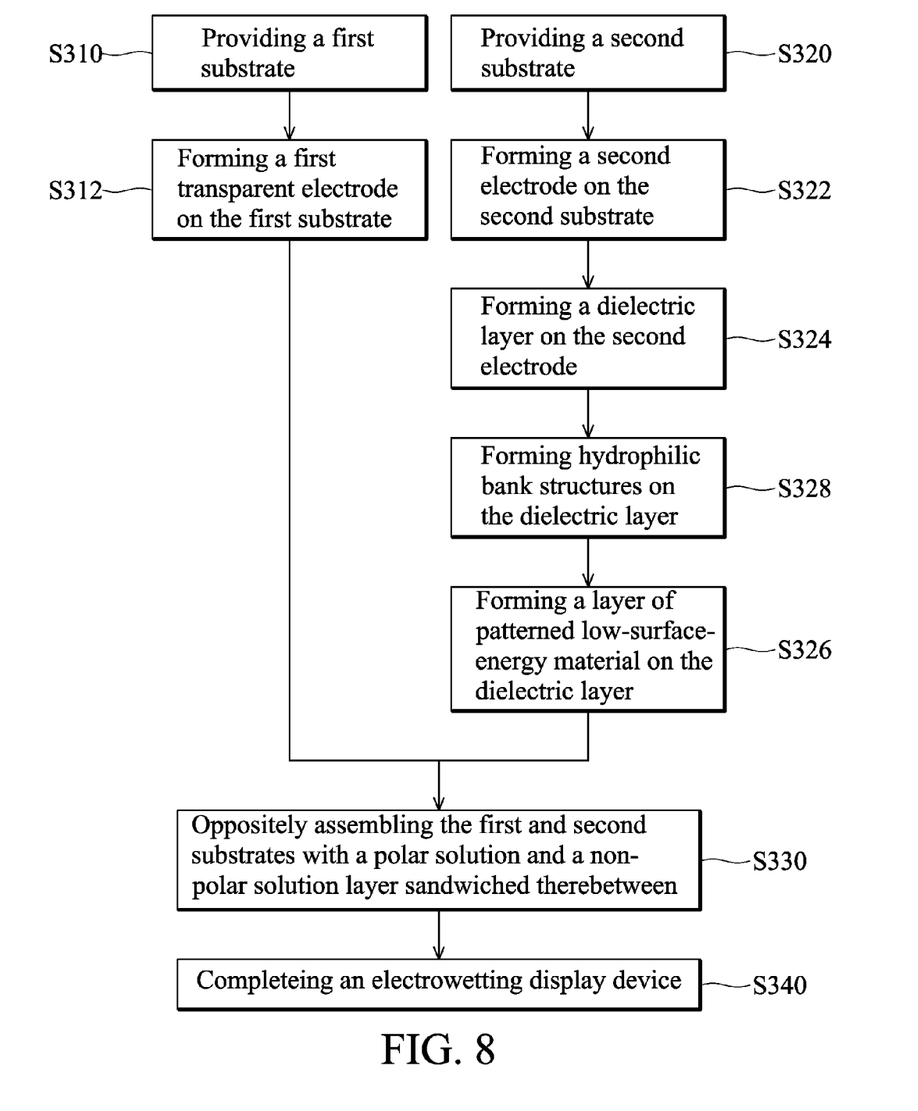
FIG. 8 is a fabrication flowchart of another embodiment of the electrowetting display device of the invention.

FIG. 8 is a fabrication flowchart of another embodiment of the electrowetting display device of the invention. The fabrication steps of this embodiment of the electrowetting display device are nearly identical to the abovementioned fabrication steps of the electrowetting display in FIG. 5, and for simplicity their detailed description is omitted. The embodiment of FIG. 8 is different from the embodiment of FIG. 5 in that the bank structure with a hydrophilic surface is formed in advance on the dielectric layer (step S328) defining a plurality of pixel regions and exposing a portion of the dielectric layer. Subsequently, a layer of patterned low-surface-energy material is then formed on the dielectric layer (step S326). For example, fluoride-containing hydrophobic polymer materials are sprayed by inkjet printing on the dielectric layer within each pixel region.

Figure 9A:
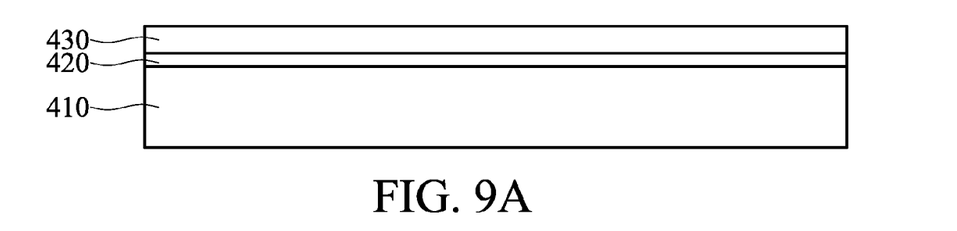
FIGS. 9A-9E are cross sections respectively illustrating each fabrication step of another embodiment of the electrowetting display device of the invention.

FIGS. 9A-9E are cross sections respectively illustrating each fabrication step of another embodiment of the electrowetting display device of the invention. Referring to FIG. 9A, a second substrate 410 is provided and is made of including glass, polymer or metal. A second electrode 420 is disposed on the second substrate 410. Next, a dielectric layer 430 is formed on the second electrode 420.

Figure 9B:
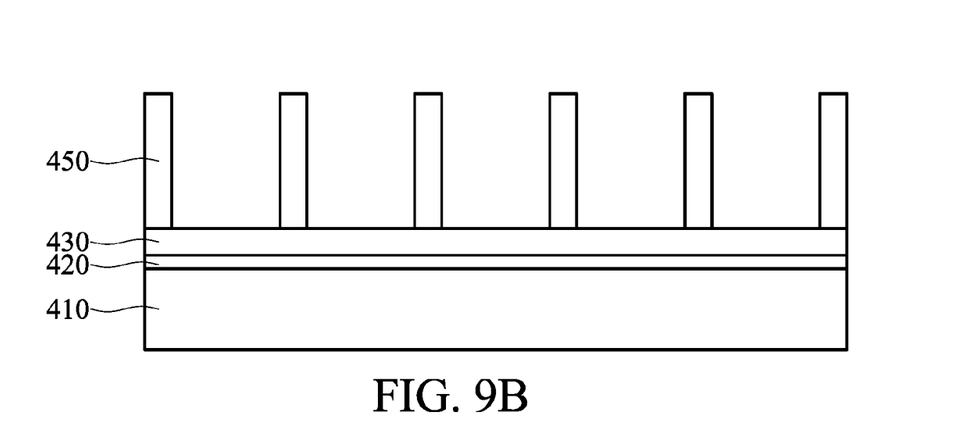

Referring to FIG. 9B, a thick-film material layer 450 such as a positive photoresist, a negative photoresist, a photoset resin or a thermoset resin is entirely and blanketly formed on the dielectric layer 430. Subsequently, lithography and etching processes are performed to pattern the thick-film material layer into a bank structure 450 with a hydrophilic surface.

Figure 9C:
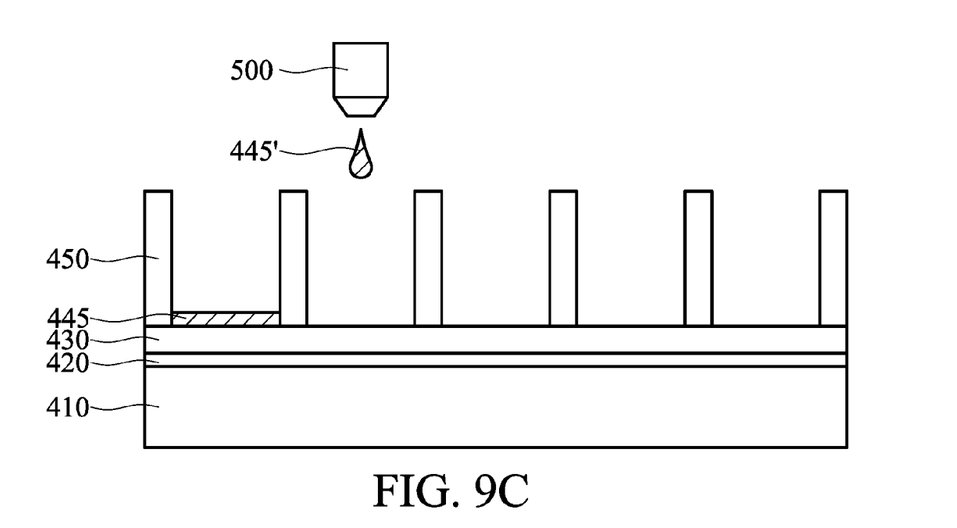

Next, referring to FIG. 9C, an inkjet process is performed by an inkjet printing apparatus 500 to inject fluoride-containing hydrophilic polymer materials 445' on the dielectric layer 430 within each pixel region to create patterned low-surface-energy material layer 445.

Figure 9D:
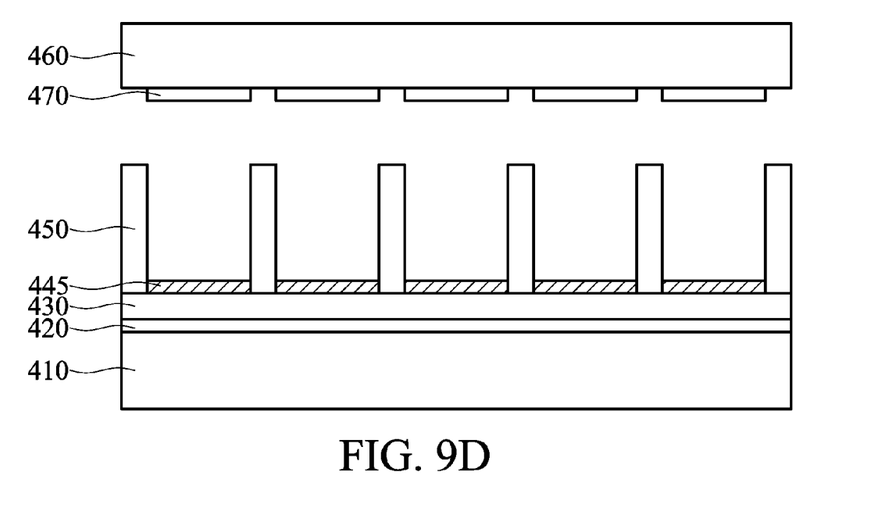
Figure 9E:
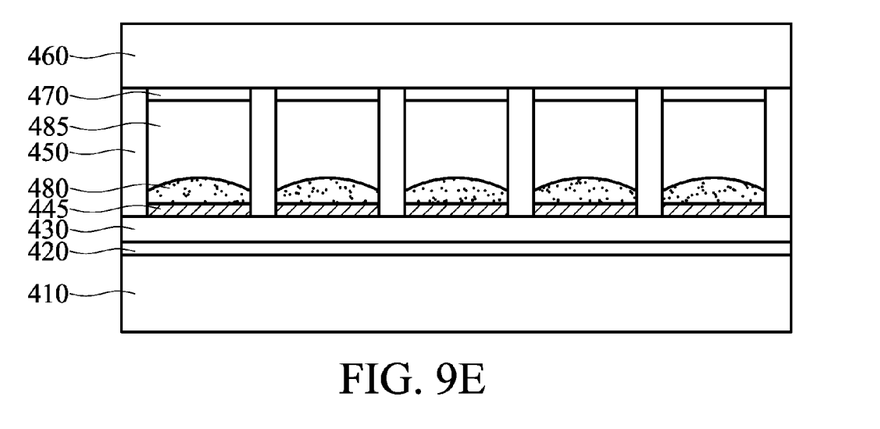

Referring to FIG. 9D, on the other hand, a first substrate 460 is provided. A first transparent electrode 470 is formed on the first substrate 460. Subsequently, the second substrate 410 and the first substrate 460 are oppositely assembled with a non-polar solution layer 480 and a polar solution layer 485 interposed therebetween, as shown in FIG. 9E. Subsequently, other essential fabrication steps such as assembling a back light unit and color filters are proceeded to complete the electrowetting display device.

Figure 10:
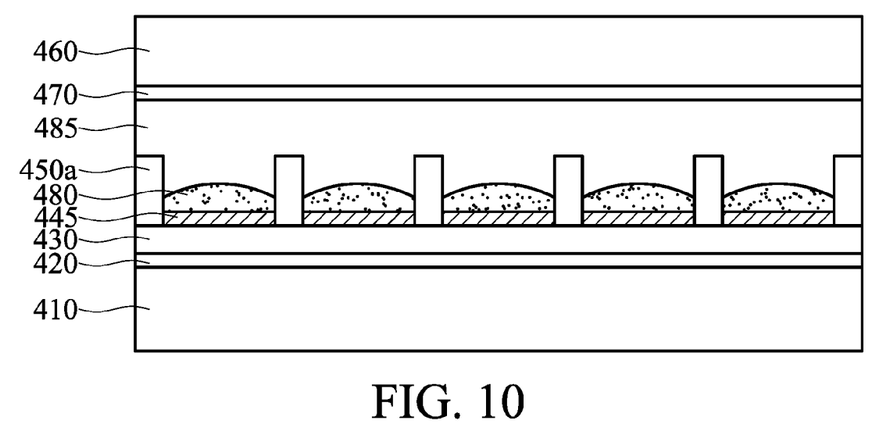
FIG. 10 is a cross section of further another embodiment of the electrowetting display device of the invention.

Note that although in the abovementioned embodiments, the bank structure 450 with a hydrophilic surface is exemplified to directly contact the first substrate 460, it is not limited to the electrowetting display devices of the invention. In other embodiments, the height of the bank structure 450a with a hydrophilic surface is less than the cell gap between the first substrate and the second substrate so that the bank structure 450a is not in contact with the first substrate 460, as shown in FIG. 10. For example, the height of the bank structure 450a is about 10 μm, and the cell gap between the first substrate and the second substrate is about 50 μm.

While the invention has been described by way of example and in terms of the several embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrowetting display device, comprising:
   a first substrate and a second substrate opposing to each other with a polar solution layer and a non-polar solution layer interposed therebetween;
   a first transparent electrode disposed on the first substrate;
   a second electrode disposed on the second substrate;
   a dielectric layer disposed on the second electrode;
   a bank structure with a hydrophilic surface directly disposed on the dielectric layer, wherein a plurality of regions are defined by the bank structure; and
   a layer of low-surface-energy material disposed on the dielectric layer within the plurality of regions.

2. The electrowetting display device as claimed in claim 1, wherein the bank structure comprises two flank extension portions contacting the layer of low-surface-energy material.

3. The electrowetting display device as claimed in claim 1, wherein the bank structure is an array of continuous bank structures with at least one portion directly disposed on the dielectric layer.

4. The electrowetting display device as claimed in claim 1, wherein the bank structure is made of a positive photoresist, a negative photoresist, a photoset resin or a thermoset resin.

5. The electrowetting display device as claimed in claim 1, wherein the bank structure is a black matrix bank structure capable of absorbing visible lights.

6. The electrowetting display device as claimed in claim 1, wherein the first substrate or the second substrate is made of glass, polymer or metal.

7. The electrowetting display device as claimed in claim 1, wherein the first transparent electrode and the second transparent electrode are patterned structures comprising a rectangular, square, triangular, circular, trapezoid, or elliptic shape.

8. The electrowetting display device as claimed in claim 1, wherein the first transparent electrode and the second transparent electrode are made of metal or oxide.

9. The electrowetting display device as claimed in claim 1, wherein the layer of low-surface-energy material comprises fluoride-containing or chloride-containing hydrophobic polymer materials, or fluoride-containing or chloride-containing self-assembly monolayer films.

10. The electrowetting display device as claimed in claim 1, wherein the thickness of the layer of low-surface-energy material is approximately in a range between 0.1 nm and 1 μm, and wherein the surface energy of the layer of low-surface-energy material is approximately 25 dyne/cm.

11. The electrowetting display device as claimed in claim 1, wherein the polar solution layer is made of water, sodium chloride solution, or potassium chloride solution.

12. The electrowetting display device as claimed in claim 1, wherein the non-polar solution layer is made of silicon oil, decane, dodecane, tetradecane, or any combinations thereof.

13. The electrowetting display device as claimed in claim 1, wherein the non-polar solution layer comprises a color dye or a color pigment.

14. The electrowetting display device as claimed in claim 1, wherein the dielectric layer is made of silicon dioxide ($SiO_2$), silicon nitride ($SiN_x$), tantalum oxide ($Ta_2O_3$), lead zirconate titanate (PZT), barium strontium titanate (BST), barium titanate (BTO), parylene, or polyvinylidene difluoride (PVDF).

15. An electrowetting display device, comprising:
   a first substrate and a second substrate opposing to each other with a transparent polar solution layer and an opaque non-polar solution layer interposed therebetween;
   a first transparent electrode disposed on the first substrate;
   a second electrode disposed on the second substrate;
   a dielectric layer disposed on the second electrode;
   a bank structure with a hydrophilic surface directly disposed on the dielectric layer, wherein a plurality of pixel regions are defined by the bank structure; and
   a layer of low-surface-energy material disposed on the dielectric layer within the plurality of pixel regions.

* * * * *